United States Patent Office 3,652,503
Patented Mar. 28, 1972

3,652,503
PRODUCTION OF AROMATIC POLYESTERS OF IMPROVED COLOUR
Warren Hewertson, Runcorn, England, assignor to Imperial Chemical Industries Limited, London, England
No Drawing. Filed Nov. 17, 1969, Ser. No. 877,502
Claims priority, application Great Britain, Dec. 3, 1968, 57,271/68
Int. Cl. C08g 17/015
U.S. Cl. 260—75 R                    16 Claims

ABSTRACT OF THE DISCLOSURE

In the production of highly polymeric polyesters of aromatic dicarboxylic acids and ethylene glycols by the polycondensation of polycondensable material at least 85 mole percent of which consists of at least one bis ethylene glycol ester of an aromatic dicarboxylic acid especially bis ethylene glycol terephthalates the use of a co-ordination compound of a trivalent antimony compound and an organic oxo compound of phosphorus or arsenic as polycondensation catalyst leads to products having a reduced tendency to a grey discolouration compared with those prepared using conventional antimonial catalysts. The preferred catalysts are coordination compound having the structure

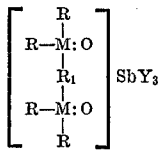

where each M is phosphorus or arsenic, each R is hydrocarbyl or hydrocarbyloxy, $R_1$ is a direct link or a divalent hydrocarbon group, especially —$CH_2$— or —$CH_2CH_2$—, and Y is an anion, especially halide.

---

This invention relates to a method of improving the colour of highly polymeric polyesters which have been obtained from polycondensations involving the use of antimony-containing polycondensation catalysts.

Highly polymeric polyesters of ethylene glycol and aromatic dicarboxylic acids, by which we mean dicarboxylic acids wherein each —COOH group is attached to a carbon atom which forms part of an aromatic carbocyclic ring, are known to be useful thermoplastic materials. Two which may be mentioned in particular are those from terephthalic acid and 1,2-di(p-carboxy phenoxy)ethane.

Highly polymeric poly(ethylene terephthalate), for example, is a thermoplastic having a very desirable combination of physical and chemical properties and is produced in large tonnages for conversion to filament, fibre and film. More recently, compositions based on it have been announced for general thermoplastic moulding, e.g. injection-moulding, applications.

For many applications, and particularly for use in fibre or filament form in textiles, for use in thermoplastic moulding applications or for use in films, it is highly desirable that these polyesters be as free from discolouration as possible.

Many processes have been proposed for the production of these polyesters and the processes have involved a variety of starting materials. In general, however, all the processes proceed via the formation of a bis ethylene glycol ester of the aromatic dicarboxylic acid and the polycondensation of this intermediate to highly polymeric polyester with loss of ethylene glycol. The bis glycol ester may be formed, for example, by reaction of the aromatic dicarboxylic acid or of an ester-forming derivative thereof, e.g. a dialkyl ester, with ethylene glycol, or by the reaction of the aromatic dicarboxylic acid with ethylene oxide or with ethylene carbonate.

Both the process of forming the bis glycol ester and the polycondensation thereof to highly polymeric polyester may be facilitated by the action of catalysts and in accordance with one preferred and widely used method of effecting the polycondensation, catalysis is provided by compounds of trivalent antimony. The use of these compounds, however, has tended to produce polymer which is discoloured by a greyish tinge which is thought to be due to residual finely divided antimony metal in the polymer. This grey discolouration is not to be confused with the yellowing which has also been observed in these highly polymeric polyesters, and which is generally believed to be due to thermal degradation of the polymer promoted by residues of the catalyst used in the formation of the bis glycol ester. Furthermore, the remedies proposed in the past for inhibiting the yellowing do not seem to provide an answer to the greying referred to. For example, the phosphorus-based additives popularly used for reducing the yellowing, e.g. phosphorous acid and organic phosphites, appear if anything to promote the grey discolouration, especially when used in conjunction with antimony trioxide.

We have now found that this tendency to a grey discolouration may be reduced by using as the antimony-based catalyst a co-ordination compound of a trivalent antimony compound and an organic oxo compound of phosphorus or arsenic.

So as not to modify, dilute or lose highly desirable properties of polyesters of ethylene glycol and aromatic dicarboxylic acids it is usually preferred that the polycondensable material consists substantially entirely of one or more bis ethylene glycol esters of aromatic dicarboxylic acids. However, the presence of a small concentration of other polycondensable material may be tolerated, if desired, for example to improve dyeability. For example, up to about 5 mole percent of the ethylene glycol moiety in the bis glycol ester or esters may be replaced by the moiety of at least one other polycondensable dihydroxy compound and/or up to about 5 mole percent of the aromatic dicarboxylic acid moiety may be replaced by the moiety of at least one another dicarboxylic acid. Up to about 5 mole percent of the polycondensable mixture may also consist of other mono- or polyfunctional material, if desired, e.g. alcohols and/or their esters with the dicarboxylic acids, amines and/or diamines and/or their amides with the dicarboxylic acids, aminoalcohols and/or their condensation products with the dicarboxylic acids, and/or amino acids, hydroxy acids, lactams and/or lactones and/or their condensation products with the dicarboxylic acids and/or glycols.

However, it is usually preferred that at least 85 mole percent, and preferably at least 95 mole percent, and preferably at least 95 mole percent, of the polycondensable mixture consists of bis ethylene glycol ester of aromatic dicarboxylic acid.

Thus, according to the present invention we provide a process for the production of highly polymeric polymer by the polycondensation of polycondensation material at least 85 mole percent of which consists of at least one bis ethylene glycol ester of an aromatic dicarboxylic acid in which said polycondensation is effected in the presence as catalyst of at least one co-ordination compound of a trivalent antimony compound with an organic oxo compound of phosphorus or arsenic.

While the process of our invention is applicable in general to the production of polyesters of ethylene glycol and any aromatic dicarboxylic acid, it is especially suitable for use in the production of highly polymeric poly(ethylene terephthalate) from the bis ethylene glycol ester of terephthalic acid since the colour of this polyester is of special importance in assessing its potential suitability for commercial applications. Examples of other aromatic dicarboxylic acids whose bis ethylene glycol esters may be converted to high polymer by the process of this invention include isophthalic acid, dicarboxydiphenyls, naphthalene dicarboxylic acids, and compounds containing two carboxyphenyl groups linked by a divalent bridging group which may be for example, alkylene, alkylene dioxy e.g. —OCH$_2$CH$_2$O—, —O—, —S—, —SO$_2$— or —CO—. Mixtures of bis glycol ethylene glycol esters of aromatic dicarboxylic acids may also be used.

As is well known, oxo compounds are compounds characterised by containing at least one oxygen atom which is bound to only one other atom and for the purposes of this specification and organic oxo compound of phosphorus or arsenic is to be understood to mean a compound wherein the atom to which the oxygen is bound is an atom of phosphorus or arsenic in its pentavalent state, and wherein one of the three remaining valencies of said phosphorus or arsenic atom is satisfied by a carbon atom or an oxygen atom the other free valency of which is satisfied by a carbon atom, and each of the remaining two valencies is satisfied by a carbon atom, or an oxygen atom the other free valency of which is satisfied by a carbon atom, or a further atom of phosphorus or arsenic.

Particular examples of organic oxo compounds of phosphorus and arsenic are those having the structure

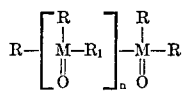   I where each M is phosphorus or arsenic, each R is a monovalent hydrocarbyl group or a monovalent hydrocarbyloxy group preferably containing not more than 8 carbon atoms, each R$_1$ is a direct link or a divalent hydrocarbon group preferably containing not more than 2 carbon atoms in the chain linking the M atom and not more than 14 carbon atoms in all, and $n$ is zero or a positive whole number, which is generally one.

When $n$ is zero in the structure I above, compounds having the structure II may be obtained.

   II where each R is selected from alkyl, aralkyl, aryl, alkaryl, alkoxy, aralkoxy, alkaryloxy and aryloxy groups, where alk(yl) includes cycloalk(yl), especially methyl ethyl, isomeric propyl, isomeric butyl, phenyl, methoxy, ethoxy, isomeric propyloxy, isomeric butoxy and phenoxy. Examples are trialkyl phosphine and arsine oxides, triaryl phosphine and arsine oxides, alkyl diaryl phosphine and arsine oxides, aryl dialkyl phosphine and arsine oxides, and trialkyl, triaryl, alkyl diaryl and aryl dialkyl-phosphates, -phosphonates and -phosphinates.

All the R's may be identical, if desired, and representative examples are trimethyl phosphine oxide, triphenyl phosphine oxide, tri-n-butyl phosphine oxide, triphenyl arsine oxide and triphenyl phosphate. Alternatively, the R's may be different and representative examples are methyl diphenyl phosphine oxide, the methyl ester of methyl phenyl phosphinic acid, trimethyl phosphinate and triphenyl phosphinate.

In the case where $n$ is 1, compounds having the structure:

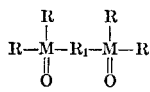   III may be obtained where each R is selected from alkyl, aralkyl, aryl, alkaryl, alkoxy, aralkoxy, alkaryloxy and aryloxy groups, where alk(yl) includes cycloalk(yl), especially methyl, ethyl, isomeric propyl, isomeric butyl, phenyl, methoxy, ethoxy, isomeric propyloxy, isomeric butoxy and phenoxy, R$_1$ is a direct link or a divalent hydrocarbon group preferably containing not more than 2 carbon atoms in the chain linking the M atoms and not more than 14 carbon atoms in all and each M is phosphorus or arsenic.

Compounds having this structure are the much preferred compounds for use in the catalysts utilised in accordance with our invention, especially where each M is phosphorus. In these compounds, R$_1$ is preferably a direct link —CH$_2$— or —CH$_2$CH$_2$—.

Representative of these compounds are:

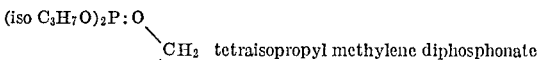 tetraisopropyl methylene diphosphonate

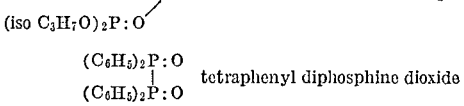 tetraphenyl diphosphine dioxide

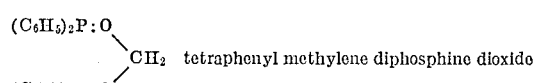 tetraphenyl methylene diphosphine dioxide

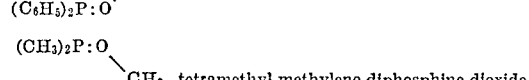 tetramethyl methylene diphosphine dioxide

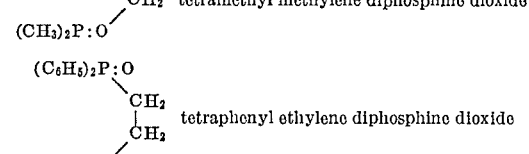 tetraphenyl ethylene diphosphine dioxide and

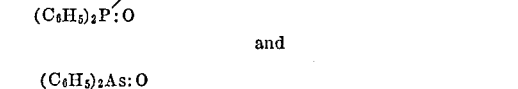 tetraphenyl methylene diarsine dioxide

Although all the R's are identical in each of the above compounds, it is to be understood that those wherein the R's are different may also be used.

The trivalent antimony compound may be any complex-forming trivalent compound of antimony. The preferred compounds are the antimony trihalides, e.g. the trichloride, tribromide and especially the trifluoride, and the antimony pseudohalides, e.g. cyanide and isocyanate. Antimony trialkyls may also be mentioned.

Representative of co-ordination compounds that may be used as catalysts are those having the structures

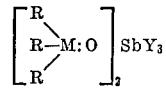   IV and

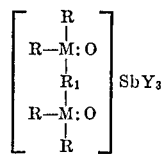   V where each R is a monovalent hydrocarbyl or hydrocarbyloxy group, e.g. methyl, ethyl, propyl, isopropyl, n-butyl, sec-butyl, t-butyl, phenyl, methoxy, ethoxy, propoxy, isopropoxy, butoxy, isobutoxy, t-butoxy or phenoxy, each R$_1$ is a direct link or a divalent hydrocarbon group, especially —CH$_2$— or —CH$_2$CH$_2$—, Y is an anion, for example, halogen, cyanide, isocyanate or alkyl e.g. methyl, and each M is phosphorus or arsenic.

The much preferred catalysts for use in the process of the invention are those having the structure V above, especially where each M is phosphorous. With the use of these compounds, not only is the tendency to grey discolouration in the polymer reduced but the rate of polymerisation may also be increased from that observed, for example, using antimony trioxide as catalyst. A further advantage of the use of at least some of our compounds is that the high softening point of the polymeric product may be maintained, especially in the case of poly(ethylene terephthalate). One compound that may be mentioned by way of example in this respect is methyl(methyl phenyl phosphinate) antimony trifluoride.

Specific examples of compounds that may be used are shown below:

[($\phi$)$_3$P:O]$_2$SbF$_3$
[($n$—C$_4$H$_9$)$_3$P:O]$_2$ SbF$_3$
[(CH$_3$)$_3$P:O]$_2$SbF$_3$
[(CH$_3$O)$_3$P:O]$_2$ SbBr$_3$

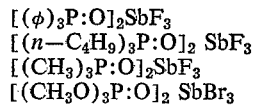

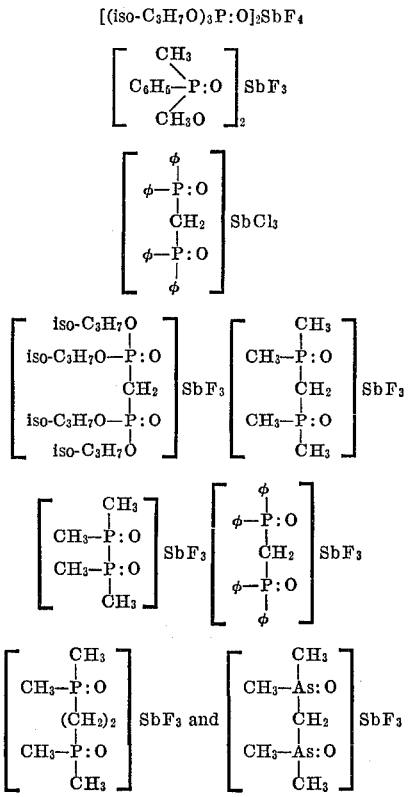

where $\varphi$ represents the phenyl group.

The compounds used as catalysts in the process of our invention may be prepared by contacting the oxo compound with the complex-forming trivalent antimony compound. This process is most conveniently carried out in solution and it may be profitable, especially where the oxo compound is a dioxide, to increase the speed of reaction by applying heat, e.g. by heating the solution under reflux. Preferably the oxo compound and the metal compound are dissolved separately in suitable solvents of which examples include acetone, methanol, chloroform, water, benzene, ethyl acetate and ethanol. The two solutions may then be mixed, heat may be applied if desired, and the metal compound produced may be recovered by filtration, crystallisation or evaporation. Preferably the solvents used for the two reagents are the same or are miscible with each other in the proportions used.

In accordance with our invention, the compounds are used as catalysts for the production of highly polymeric polymers by the polycondensation of polycondensable mixtures consisting predominantly or entirely of one or more bis ethylene glycol esters of aromatic dicarboxylic acids.

The polycondensation, which may be effected batchwise or as a continuous reaction is preferably effected at a temperature of at least 280° C., in order to achieve desirable rates of reaction, and high vacuum is generally applied in order to aid the removal of glycol by-product. The reaction is usually continued until the desired molecular weight is achieved. The viscosity of the melt provides a measure of molecular weight and the progress of the reaction may be determined by observing the increase in melt viscosity with time.

The amount of catalyst used will generally be in the range 0.02 to 0.2% by weight of bis glycol ester although amounts as small as 0.005% or up to as great as 0.5% by weight may be used if desired.

One method of estimating the effectiveness of our process is with reference to the luminance of the polymeric products. Luminance is a measure of the proportion of the incident light reflected on examination of the polymer using a "Colormaster" which is the trade name for the differential colorimeter manufactured by Manufacturers Engineering and Equipment Corporation. The luminance may be measured on the as made polymer or on articles, e.g. filaments, fibres, films or moulded articles, fabricated therefrom.

In the case of poly(ethylene terephthalate), in particular, relatively small variations in luminance can be of considerable importance in determining the value of a particular polymer for commercial purposes. It is thus highly desirable, particularly for filament end uses, that the polymer should have a high luminance value. However, luminance values depend to a considerable degree upon the history of formation of the polymer and comparisons of results found in the examples are only meaningful where the polymers in question were prepared under identical conditions, on the same scale, and in the same equipment.

The inventin is now illustrated by the following examples in which all parts are expressed as parts by weight and all reported intrinsic viscosities were measured on solutions of 1 g. of polymer in 100 ml. of o-chlorophenol at 25° C.

EXAMPLE 1

Experiment A 100 parts of dimethyl terephthalate and 71 parts of ethylene glycol were added to a stainless steel vessel which had previously been purged with nitrogen and was provided with heating means, a stirrer, an off-take for volatile material and a nitrogen inlet and outlet. The mixture was then melted at 120–130° C. under nitrogen and an amount of manganese acetate tetrahydrate equivalent to 0.025 part of anhydrous manganous acetate was added. Gentle heating was then applied and the temperature was gradually raised to 220° C. and the methanol distilled off. When the theoretical amount of methanol had been collected, 0.015 part of phosphorous acid was added and the mixture transferred under oxygen-free conditions to a stirred polymerisation autoclave. 0.074 part of antimony trifluoride and 0.5 part of titanium dioxide were then added and the temperature raised to 235° C. Pressure was then reduced to 1 mm. of mercury absolute while the temperature was raised to 290° C. until an adequate melt viscosity had been achieved, and the polymer then extruded and granulated. The polymeric product, intrinsic viscosity 0.71, had a luminance value of 54.

Experiment B

The process was then repeated but using 0.14 part of bis(triphenylphosphine oxide) antmiony trifluoride in place of the antimony trifluoride and phosphorous acid. (This is equivalent to about 0.11% by weight of the complex based on bis glycol ester, assuming 10% conversion of the dimethyl terephthalate.) The polymeric product, intrinsic viscosity 0.66, had a luminance value of 62.

The bis(triphenylphosphine oxide) antimony trifluoride catalyst was prepared as follows. Triphenylphosphine oxide (50 parts) in methanol (48 parts) was added to antimony trifluoride (17.0 parts) in methanol (48 parts) at room temperature. On cooling to −50° C., a product was deposited in the form of crystals. Recrystallisation from methanol gave the complex in the form of crystals melting at 193–195° C.

Elemental analysis of the crystals gave the following; the theoretical figures for $C_{36}H_{30}F_3O_2P_2Sb$ are given in parenthesis:

C, 58.4 (58.8)
H, 4.11 (4.10)
F, 7.82 (7.75)
P, 9.02 (9.02)

EXAMPLE 2

The process of Experiment 1B was repeated but using 0.064 part of tetraphenyl methylene diphosphine dioxide antimony trifluoride in place of the triphenylphosphine oxide catalyst. (This is equivalent to about 0.049% by weight of the compound based on bis glycol ester, assuming 100% conversion of the dimethyl terephthalate.) The polymeric product, intrinsic viscosity 0.70, had a luminance value of 72.

The diphosphine dioxide was prepared as follows. Tetraphenyl methylene diphosphine (38.4 parts) in 320 parts of acetone was oxidised with a solution of 23 parts of 100 volume hydrogen peroxide in 80 parts of acetone at 0° C. The dioxide so obtained crystallised out on evaporation of the solvent to about one third of the original volume. It was then recrystallised from hot acetone and dried in a vacuum oven at 120° C. for 3 hours. Its melting point was 185–186° C. and the yield was 75–85%.

The catalyst was then prepared as follows:

Antimony trifluoride (30 parts) in hot methanol (120 parts) was treated with a solution of tetraphenyl methylene diphosphine dioxide (70 parts) in hot methanol (300 parts) with stirring under nitrogen. The resulting solution was heated under reflux for 1½ hours and filtered. On cooling in ice/water the colourless crystalline product was filtered off and washed with methanol. It was recrystallised from methanol and dried in a vacuum oven at 60° C. Yield 78–90 parts; melting point 210° C.

The compound was characterised by its elemental analysis and by mass and infra-red spectroscopy.

By way of comparison, the polymerisation was repeated but replacing the compound with a simple mixture of antimony trifluoride (0.019 part) and the diphosphine dioxide (0.043 part). The polymeric product, intrinsic viscosity 0.71, had a luminance of 67.

EXAMPLE 3

The process of Experiment 1B was repeated but using 0.14 part of tetraphenyl methylene diarsine dioxide antimony trifluoride in place of the triphenyl phosphine oxide catalyst. The polymeric product, intrinsic viscosity 0.68, had a luminance value of 74.

The diarsine dioxide was prepared as follows. Triphenylarsine (25 parts) was added to a well stirred solution of sodium (3.7 parts) in liquid ammonia (425 parts) under nitrogen at —75° C. When the colour of the solution changed from blue to orange, ammonium chloride, (4.28 parts) was added and the reaction mixture was stirred for an hour. Methylene chloride (6.68 parts) was added dropwise until the colour was discharged. After allowing the ammonia to evaporate the solid residue was washed five times with water and then twice with methanol and recrystallised from n-propanol to yield tetraphenyl methylene diarsine as a colourless crystalline solid, melting at 98° C. This diarsine was oxidised with an excess of hydrogen peroxide in acetone and the oil obtained after evaporation of acetone, believed to be an adduct of the dioxide with hydrogen peroxide, was treated with nitric acid (30%). The resulting white solid, $$[(C_6H_5)_2As:O]_2CH_2.2HNO_3$$

was filtered off and dissolved in dilute aqueous ammonia, and the solution was extracted with chloroform. The pale yellow solid obtained after evaporation of the solvent was recrystallised from a methylene chloride/diethyl ether  mixture to give the colourless diarsine dioxide, melting point 205–207° C.

EXAMPLE 4

The process of Experiment 1B was repeated but using 0.095 part of tetraisopropyl methylene diphosphonate antimony trifluoride in place of the triphenyl phosphine oxide compound. (This is equivalent to about 0.07% by weight of the compound based on bis glycol ester, assuming 100% conversion of the dimethyl terephthalate.) The polymeric product, intrinsic viscosity 0.66, had a luminance value of 79.

The diphosphonate was prepared by the process described in the Journal of the American Chemical Society (1961) volume 83 at page 1722. The catalyst was obtained from the diphosphonate as follows. A solution of 20 parts of the diphosphonate in dry acetone (20 parts) was added to a solution of antimony trifluoride (10.4 parts) in hot dry acetone (300 parts). The resulting solution was heated under reflux for 1½ hours and cooled. After reducing the volume of solvent under vacuum, a crystalline solid was deposited. This was filtered off and recrystallised by dissolving in acetone at about 40° C. and cooling to 30° C. 22.5 parts of a crystalline solid melting at 58–60° C. were obtained. The solid was characterised by its elemental analysis and infra-red spectrum.

By way of comparison, the polymerisation was repeated with the compound replaced by a simple mixture of antimony trifluoride (0.037 part) and the phosphonate (0.063 part). The polymeric product, intrinsic viscosity 0.68, had a luminance value of 75.

What we claim is:

1. In a process for the production of a film- or fibre-forming or mouldable polyester by the polycondensation of a bis ethylene glycol ester of an aromatic dicarboxylic acid, the improvement which comprises carrying out said polycondensation in the presence of, as catalyst, 0.005 to 0.5%, by weight, based on the bis glycol ester, of at least one antimony compound of the structure

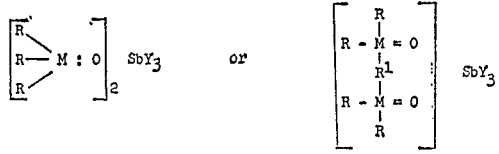

where each R is alkyl having 1–4 carbon atoms or phenyl, $R^1$ is —$CH_2$— or —$CH_2$—$CH_2$—, M is phosphorus or arsenic and Y is a halogen.

2. A process as claimed in claim 1 in which the co-ordination compound has the structure $$[(\phi)_3P{:}O]_2SbF_3$$

where $\phi$ represents the phenyl group.

3. A process as claimed in claim 1 in which the co-ordination compound has the structure $$[(n{-}C_4H_9)_3P{:}O]_2SbF_3$$

4. A process as claimed in claim 1 in which the co-ordination compound has the structure $$[(CH_3)_3P{:}O]_2SbF_3$$

5. A process as claimed in claim 1 in which the co-ordination compound has the structure $$[(CH_3O)_3P{:}O]_2SbBr_3$$

6. A process as claimed in claim 1 in which the co-ordination compound has the structure $$[(iso{-}C_3H_7O)_3P{:}O]_2SbF_3$$

7. A process as claimed in claim 1 in which the co-ordination compound has the structure

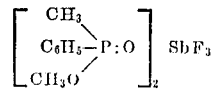

8. A process as claimed in claim 1 in which the coordination compound has the structure

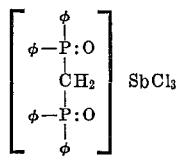

where φ represents the phenyl group.

9. A process as claimed in claim 1 in which the coordination compound has the structure

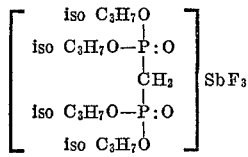

10. A process as claimed in claim 1 in which the coordination compound has the structure

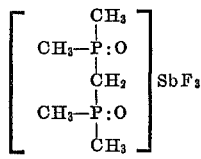

11. A process as claimed in claim 1 in which the coordination compound has the structure

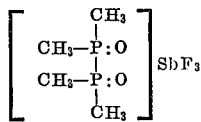

12. A process as claimed in claim 1 in which the coordination compound has the structure

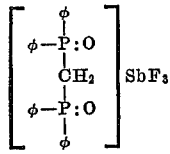

where φ represents the phenyl group.

13. A process as claimed in claim 1 in which the coordination compound has the structure

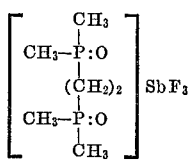

14. A process as claimed in claim 1 in which the coordination compound has the structure

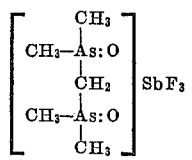

15. A process as claimed in claim 1 in which the coordination compound is used in an amount of from 0.02% to 0.2% by weight of the bis ethylene glycol ester.

16. A process as claimed in claim 1 in which the bis ethylene glycol ester is bis ethylene glycol terephthalate.

References Cited

UNITED STATES PATENTS

| | | | |
|---|---|---|---|
| 2,921,051 | 1/1960 | Amborski et al. | |
| 3,028,366 | 4/1962 | Engle et al. | 260—75 |
| 3,412,070 | 11/1968 | Jakob et al. | 260—75 P |
| 3,509,099 | 4/1970 | Carter et al. | 260—75 |

FOREIGN PATENTS

| | | | |
|---|---|---|---|
| 1,013,573 | 12/1965 | Great Britain. | |
| 1,046,831 | 10/1966 | Great Britain | 260—75 P |

MELVIN GOLDSTEIN, Primary Examiner